United States Patent [19]
McInnis

[11] Patent Number: 4,493,471
[45] Date of Patent: Jan. 15, 1985

[54] SOUND SPEAKER STAND FOR ATTENUATING VIBRATIONS

[76] Inventor: Donald E. McInnis, 1611 Elwood Dr., Los Gatos, Calif. 95030

[21] Appl. No.: 466,059

[22] Filed: Feb. 14, 1983

[51] Int. Cl.³ .............................................. F16M 13/00
[52] U.S. Cl. ..................................... 248/580; 248/619; 179/146 E; 179/180; 181/208
[58] Field of Search ............... 248/619, 632, 633, 634, 248/441.1, 349, 580; 179/146 E, 147, 180, 178; 181/207, 208, 285, 293

[56] References Cited

U.S. PATENT DOCUMENTS

| | | | |
|---|---|---|---|
| 1,889,501 | 11/1932 | Schnake | 248/441.1 |
| 2,661,943 | 12/1953 | Wilbur | 248/632 |
| 3,199,826 | 8/1965 | Miller | 248/349 |
| 3,311,331 | 3/1967 | Steimen | 248/633 |
| 3,362,666 | 1/1968 | O'Donnell | 248/633 |
| 4,251,045 | 2/1981 | Meyerle | 248/619 |
| 4,273,213 | 6/1981 | Munz | 248/633 |
| 4,369,949 | 1/1983 | Zopf | 248/632 |

FOREIGN PATENT DOCUMENTS 132075  10/1979  Japan .................................. 248/632

Primary Examiner—Reinaldo P. Machado
Assistant Examiner—Alvin Chin-Shue
Attorney, Agent, or Firm—Gerald L. Moore

[57] ABSTRACT

A speaker stand for supporting a speaker enclosure on the floor comprising a rigid planar member (11) supporting a waffled cushion pad (12) on the top surface with the pad including peaks 17 and valleys 19. Semiresilient rails (13, 14, 15, 16) positioned to the side of said pad support and stabilize the speaker enclosure such that the pad is depressed sufficiently to form air pockets between the pad and speaker enclosure in the areas of the valleys to attenuate vibratory motion and acoustic sound wave transmissions between the speaker and floor.

6 Claims, 8 Drawing Figures

SOUND SPEAKER STAND FOR ATTENUATING VIBRATIONS

FIELD OF THE INVENTION

This invention relates to a speaker stand of the type that positions the speaker for good sound distribution and attenuates vibratory motion transmitted between the speaker and the supporting floor.

BACKGROUND OF THE INVENTION

In the past, speaker stands primarily aimed the tweeter and mid-range speakers to ear level for better sound dispersion throughout the room. In addition, such speaker stands elevated the speaker a considerable distance off the floor in an attempt to limit the amount of vibratory motion transmitted between the speaker and the floor, the theory being that distance would weaken and lessen the vibration signal generated by the speaker. A four to eight inch separation between the floor and speaker cabinet was found to be the most practicable distance.

It is important to limit such vibratory motion in order to prevent the transmission of these vibrations from the speaker cabinet to the sound reproduction equipment, i.e., the phonograph turntable or tape deck, and to prevent reverberation of sound energy off the floor and back into the speaker cabinet. Such mechanical feedback serves to disrupt the generated signal of the turntable or tape deck and generally dampens and impedes the resonating quality of the speaker cabinet thereby reducing the overall quality of the sound being reproduced.

It is the purpose of the present invention to adjust the projection angle of the speaker enclosure for good sound dispersion and to effectively attenuate any vibratory motion transmitted from the enclosure to the stand. The invention does this by utilizing anti-vibration and acoustic absorbing materials formed into air chambers which dissipate the vibratory energy thereby not requiring elevation of the speaker box a considerable distance from the floor.

SUMMARY OF THE INVENTION

A speaker stand for supporting a sound enclosure having a base forming a planer bottom surface. The speaker stand comprises a rigid planer member of sufficient size to hold the base of the speaker stand, a cushioning, sound-absorbing pad positioned on said rigid member to contact said speaker enclosure bottom surface and support said sound enclosure. The pad includes a top surface designed to attenuate acoustic and physical vibrations. The pad is comprised of sound absorbing material with a plurality of peaks and valleys which form, with the speaker bottom surface, a plurality of air pockets. The pad also includes a peripheral area designed to attenuate physical vibrations comprising stabilizer bars or rails made of anti-vibration material rigid enough to prevent the center portion of the pad's peaks from being depressed flat with the valleys thereby preserving cavities or air pockets underneath the speaker base. These air pockets form a buffer of air that attenuates both acoustic and physical vibrations generated by the bottom surface of the speaker cabinet.

DESCRIPTION OF THE INVENTION

Figure 1:
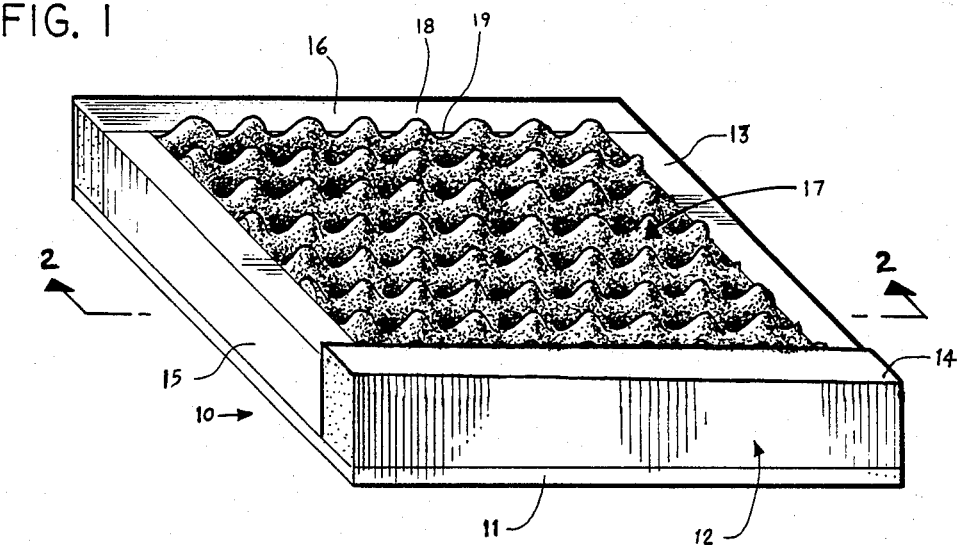
FIG. 1 is a perspective view showing a first embodiment of a speaker stand incorporating the subject invention.
Figure 3:
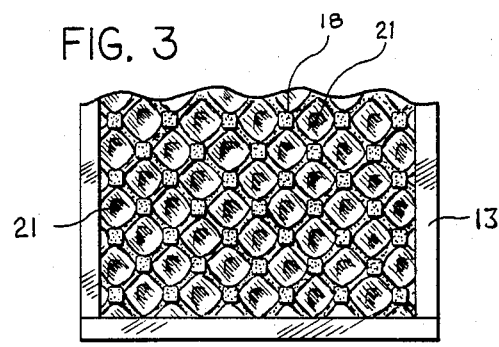
FIG. 3 is a top view of the pad and stabilizer rails as they appear after the speaker enclosure is placed thereon.

In FIG. 1 is shown a first embodiment of the invention in the form of a speaker stand 10 formed of a base member 11 and a cushion or acoustic pad 12. The base member preferably is made of plexiglas but can be made of such material as metal or wood. In this instance the plexiglas is comprised of a rigid base 11 of a size sufficient to support the bottom wall of a speaker enclosure (not shown). Positioned on this rigid base is the waffled-cushion acoustic pad of the type shown in FIG. 1 surrounded completely by the semiresilient stabilizer rails 13, 14, 15 and 16. In this embodiment it is desireable to provide side support for the speaker enclosure in all directions. Therefore the semiresilient rails extend under all bottom side-edges of the enclosure. The rail 14 in FIG. 1 is thicker than the other three side rails sufficiently to tilt the front sound projecting portion of the speaker cabinet back three to five degrees so as to aim the tweeter and mid-range speakers to ear level for better sound dispersion at a seated, or in some instances, standing position.

As mentioned before, one of the problems of operating sound reproduction equipment is the mechanical feedback between the electronic signal generating equipment and the speaker cabinets. The speaker enclosures naturally vibrate because of the generation of sound and compression waves from the sound speakers positioned within the cabinet. As a result of the generation of the compression waves within the enclosure, the side walls and bottom wall forming the cabinet base vibrate, which naturally transmits vibratory motion to the floor or to the speaker stand and then to the floor. This vibratory motion results from acoustic waves, eminating from the base of the speaker enclosure, impacting nearby objects (i.e. the floor) setting these objects into motion; and physical vibratons which occur when a non-vibrating object (i.e. speaker stand or floor) is set into motion by a vibrating object (i.e. the speaker enclosure) that is in contact with the non-vibrating object. Further, such vibratory motion also feeds back into the speaker enclosure from the floor and, or, through the stand which connects the speaker box and floor, thereby producing unwanted sound vibrations which impede and dampen the desired sound resonations being generated within the speaker enclosure. The result is a "sloppy" or "boomy" base, diminished highs and mid-range signals lacking definition and clarity. One of the deficiencies of traditional speaker stands is that they do not physically decouple (disconnect) the speaker cabinet from the floor sufficiently so as to eliminate the transmission of the cabinet motion to the floor. This is due to the fact that such prior speaker stands rigidly couple (connect) the floor directly to the speaker enclosure thereby providing a bridge for phsical transmission of vibratory motion. As the speaker volume is increased, vibration transfer (both physically and by acoustic sound waves) increases until distance alone is insufficient to decouple the speaker enclosure from the supporting floor.

Figure 2:
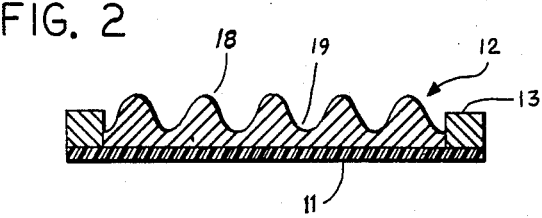
FIG. 2 is a cross section view along the line 2—2 of FIG. 1.
Figure 2A:
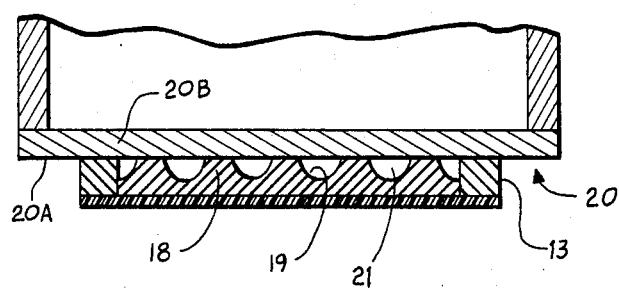
FIG. 2A is a cross-sectional view along the line 2—2 of FIG. 1 with the speaker base positioned on and compressing the stand pad.

For the purpose of attenuating this vibratory motion there is positioned on the support member 11 of the stand base the cushioned pad 12 comprising a waffled peaked surface section 17 having a plurality of peak or high areas 18 (FIG. 1) forming therebetween a plurality of valley or low areas 19. This peaked cushion preferably is made of a resilient material such as acoustic foam rubber so that the peaks will contact and be depressed by the weight of the speaker impressed through the bottom surface 20A of the bottom wall 20B of the sound enclosure 20 until the peaks actually contact to form a plurality of air chambers 21 (FIG. 2A) therebetween. The peaks and stabilizer rails are sufficiently stable or firm to support the weight of the speaker with the base bottom surface spaced above the level of the bottom of the valleys thereby forming air chambers with the speaker base. The air chambers decouple the sound enclosure from the rigid surface of the speaker stand by allowing for individual area flexing of the speaker enclosure base in the manner of individual shock absorbers and, because of the enclosed air within the chambers, the vibratory energy compresses the air in the formed chambers against the acoustic pad causing force to be exerted in all directions. The force exerted is mostly dissipated through air molecular friction within the compressed air chambers thereby partially attenuating such energy and preventing its transmission to the stand and onto the supporting floor. Additionally the force exerted laterally never reaches the floor but is dissipated by the pad. Such molecular friction attenuates both acoustic wave vibration and physical vibration. Further, the acoustic cellular structure of the pad material traps and dissipates the vibratory energy of the speaker enclosure thereby providing a second layer of acoustic separation between speaker enclosure and the floor. The use of anti-vibratory materials (i.e. elastomers, etc.) are alone insufficient since speaker enclosures produce both acoustic (sound wave) vibrations and physical vibrations. Materials designed to inhibit physical vibrations are less effective against acoustic vibrations and vice versa. Also, acoustic wave lengths, which vary depending on the nature of the frequency signal, further make less effective anti-vibration materials which are effitive against physical vibrations. Yet another problem of using anti-vibratory material is that the anti-vibratory materials tend to reverberate sound waves and, or, physical vibrations back into the speaker enclosure. Molecular friction prevents or limits this effect.

To stabilize the speaker on the waffled pad, the semi-resilient rails 13, 14, 15 and 16 are positioned along the edges of the pad. These rails are made of slightly less resilient material than the waffle pad so as to support the edges of the speaker enclosure. These rails are of an anti-vibration material so as not to transmit vibratory motion which would otherwise couple the speaker enclosure to the floor. These enclosure edges because of their being joined to the sidewalls of the speaker enclosure do not transmit much vibratory motion so as to couple the speaker enclosure to the floor.

Figure 4:
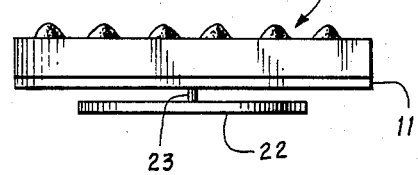
FIG. 4 is a side view of the stand shown in FIG. 1.
Figure 5:
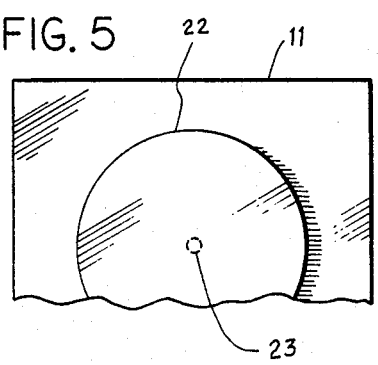
FIG. 5 is a bottom view of the stand shown in FIG. 1.

Fixed to the bottom of the rigid base 11 of the first embodiment (FIG. 4) is a support 22 (FIGS. 4 and 5) which is a circular, planar member fixed by a single axle 23 to the base 11. Thus the base 11 can be rotated about this axle to allow turning of the speaker enclosure about a vertical axis for aiming the speaker in varying directions in the room.

Figure 6:
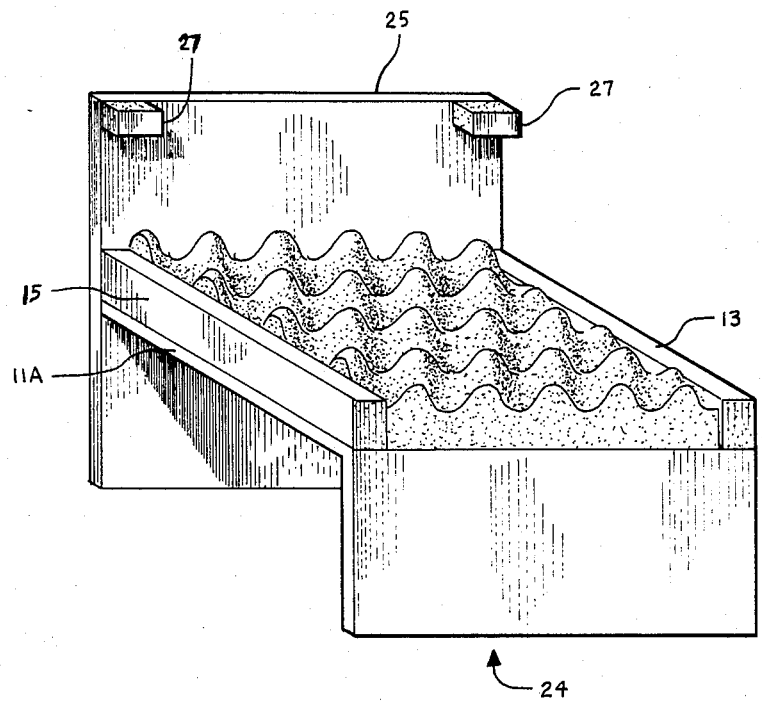
FIG. 6 is a perspective view of a second embodiment of a speaker stand incorporating the subject acoustic pad.
Figure 7:
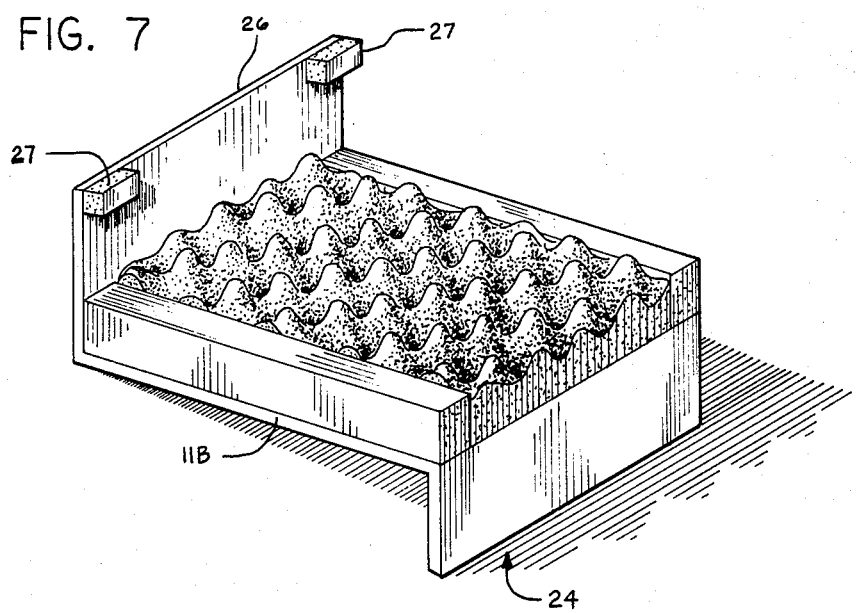
FIG. 7 is a perspective view of a third embodiment of a wedge style speaker stand incorporating the subject invention.

Additionally, in the second embodiment (FIG. 6) and the third embodiment (FIG. 7) of the invention a front vertical member 24 is attached to the rigid planar member 11A and 11B respectively. To stabilize the speaker in a tilted attitude back, vertical members 25 and 26 are attached to the rigid planar members 11A and 11B. In the second embodiment (FIG. 6) the back vertical member 25 is attached to a formed portion (not shown) of the rigid planar member 11A and is adjustable so as to allow the attitude of the rigid planar member to be changed in the horizontal direction. In the third embodiment (FIG. 7) the back vertical member 26 is formed integral with the rigid planar member 11B. To isolate the back vertical members 25 and 26 from the vibrating speaker enclosure a plurality of resilient pads 27 are fixed thereto and contact the enclosure's back wall. These pads are sufficiently flexible to limit transmission of vibratory forces from the enclosure to the back member.

Thus it has been found that the subject speaker stand positions the supported speaker enclosure close to the floor with the speaker being mechanically decoupled by compressed air pockets and acoustic material positioned between the speaker stand and the supporting floor. The combination of the rigid speaker support and the acoustic pad provides more versatility in the positioning of the speaker within the room as well as being aesthetically pleasing by providing a speaker stand not readily visible underneath the speaker while decoupling the speaker cabinet from the floor.

I claim:

1. A speaker stand for supporting a speaker enclosure on a floor and wherein the speaker has a base forming a planar bottom surface, said stand comprising:
    a rigid planar member having a top surface of sufficient size to support the base of the speaker enclosure;
    a waffled cushion member fixed to the top surface of said base, said cushion member comprising a top layer of resilient material forming a plurality of peaks and valleys facing upward so as to form a plurality of closed, air pockets with the speaker bottom surface to attenuate vibratory motion transmitted therebetween, a plurality of resilient members of less resiliency than said cushion member supported to the opposite sides of said cushion member to support and stabilize said speaker enclosure while preventing the leveling of said peaks with the valleys of the cushion member.

2. A speaker stand as defined in claim 1 including a second base and rotatable means fixed to the bottom of the rigid planar member and said second base thereby allowing rotation of the speaker about a vertical axis.

3. A speaker stand as defined in claim 1 wherein said resilient members includes four resilient stabilizer rails fixed around the edges of said cushion member with one being raised sufficiently so as to tilt the speaker enclosure for better dispersion of sound within the room.

4. A speaker stand as defined in claim 1 including a support and means fixing said support to one edge of the rigid planar member to position said planar member at an angle to the floor so as to tilt the planar member and speaker enclosure relative to said floor.

5. A speaker stand as defined in claim 4 including a vertical planar member fixed to the opposite edge of said planar member from said one edge in a position to extend upward along said speaker enclosure to stabilize the speaker enclosure when tilted relative to the floor.

6. The method of decoupling a speaker enclosure from a floor comprising the step of:

supporting the speaker enclosure on a resilient pad having a top waffle surface having peaks and valleys and stabilizer rails fixed around the edges of said pad and being of sufficient rigidity to support the speaker enclosure high enough to form air pockets in the areas of the valleys and and between the speaker enclosure and the pad top surface to attenuate vibratory motion and acoustic sound waves transmitted from the speaker enclosure.

* * * * *